United States Patent Office 3,178,007
Patented Apr. 13, 1965

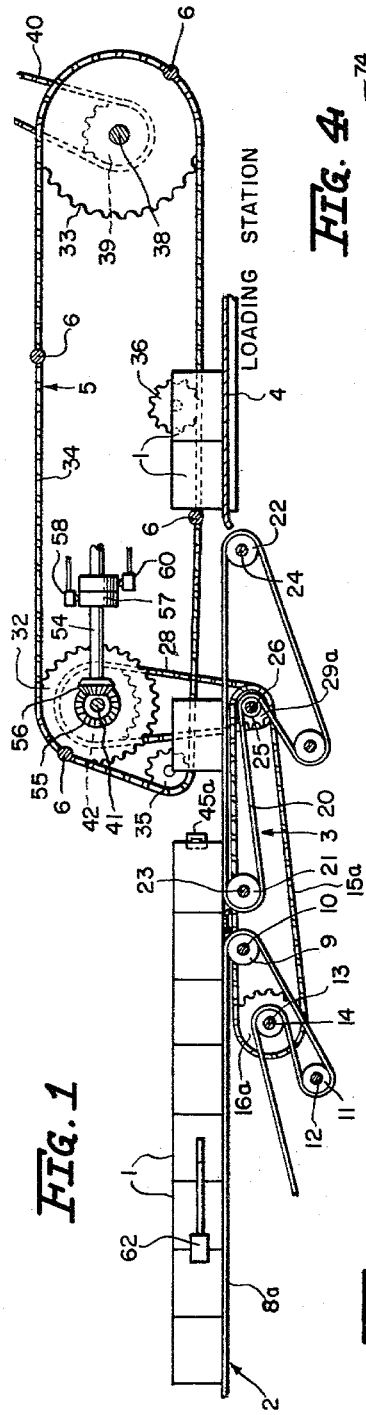
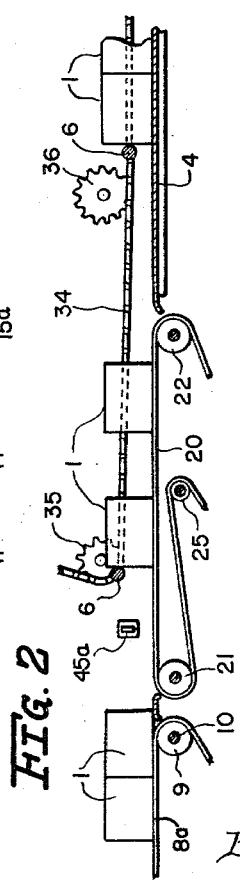
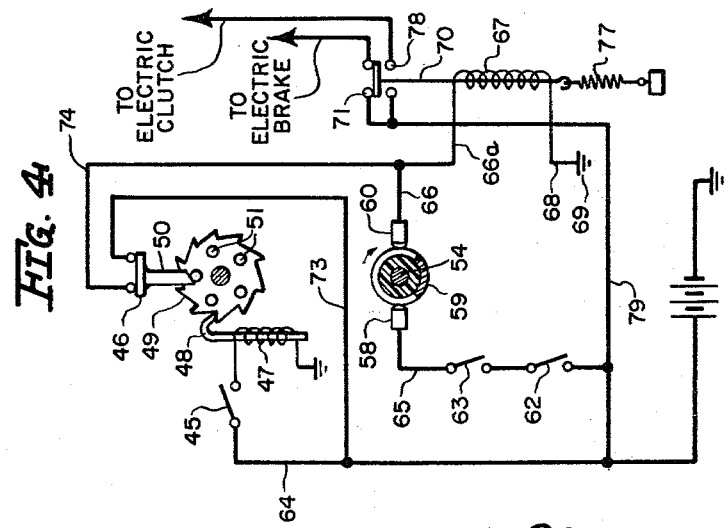
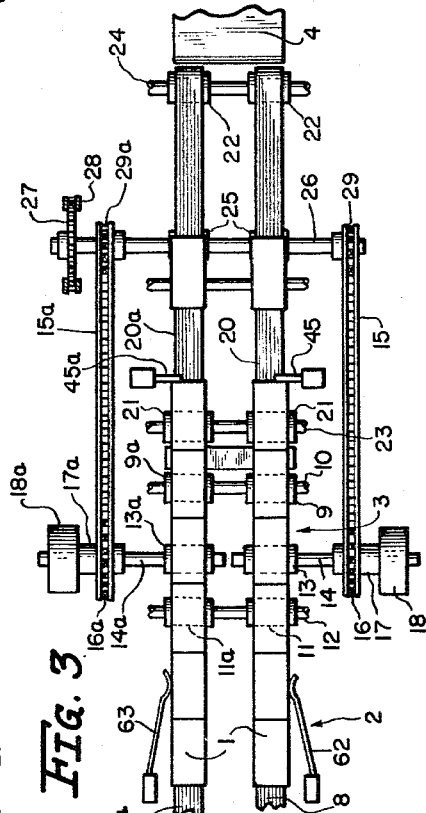

3,178,007
ARTICLE GROUPING MECHANISM
Wendell E. Standley, Lake Forest, and Richard B. Wittmann, Chicago, Ill., assignors, by mesne assignments, to Johns-Nigrelli-Johns, Inc., Skokie, Ill., a corporation of Illinois
Filed Apr. 3, 1963, Ser. No. 270,310
8 Claims. (Cl. 198—34)

The present invention relates to mechanism for grouping articles on a conveyor and more particularly to converting one or more rows of uniform size articles, advancing in abutted relation, into spaced groups of conveyed, abutted articles.

A principal object of the invention is to segregate from an article supply conveyor a predetermined number of aligned articles of uniform size and cause such segregated articles to be assembled in abutted relation and advanced to a point, such as a loading station, where the articles may be deposited into a suitable container.

A further object of the invention is to provide article segregating means that is effective for accurate segregation of a plurality of aligned groups of articles arranged abreast of each other as, for example, arranging a sub-group of two or more articles, one behind the other, and concurrently arranging two or more similar sub-groups in lateral or abreast relation to obtain a final article group of rectangular shape suitable for loading into an open-top rectangular container.

Additional and more specific objects and advantages of the present invention will become apparent as the description proceeds.

In the drawings—

FIGURE 1 is a diagrammatic view in side elevation of a conveyor system for segregating groups of articles from a supply of such articles arranged in abutted relation;

FIGURE 2 is a fragmentary side elevation view, similar to FIGURE 1, showing the progress of a pair of articles toward grouped condition;

FIGURE 3 is a diagrammatic plan view of the conveyor system with certain parts omitted in the interest of clarity of illustration; and FIGURE 4 is a wiring diagram.

The article grouping mechanism herein illustrated is particularly adapted for use with a case or tray loading mechanism, such as disclosed in the copending application of B. J. Nigrelli et al., Serial No. 250,543, filed January 10, 1963, now Patent No. 3,141,274, to which reference is made for a more detailed showing of certain elements of the mechanism. As shown in this copending application, two abutted lines of articles, such as can packages, are advanced on a supply conveyor to a receiving conveyor preferably operating at a speed in excess of that of the supply conveyor. After two articles in each abutted line have been discharged onto the receiving conveyor a push rod on an overhead conveyor enters the space at the rear of the trailing article. The articles to be grouped move to the discharge end of the receiving conveyor and at this point the group is formed and the push rod on the overhead conveyor pushes the group over a dead plate and onto the loading guides preparatory to the delivery of the group of articles into a case or tray at a loading station.

According to the present invention the supply conveyor belt, or a plurality of belts arranged in parallelism, will be periodically started and stopped in timed relation to the travel of the push rods so that a predetermined number of articles will be fed from the supply conveyor section and delivered to the receiving conveyor section in spaced relation from oncoming articles, and a push rod on the overhead conveyor will enter into the space behind the group being segregated and will thereafter advance such group to a desired point.

Referring more particularly to the drawings, one or more lines of articles 1, 1 advance on feeding conveyors, generally indicated at 2, 2. The articles are delivered to receiving conveyors, generally indicated at 3, 3, and, on these conveyors, the articles are advanced to an article support section 4, herein shown in the form of a plate over which the articles may slide. The articles move to the discharge end of the conveyors 3, 3 and come to rest as they move onto the plate 4. They are then moved along the plate by propelling means herein illustrated as push rods 6, 6 on an article group conveyor, indicated generally at 5.

The articles, as herein illustrated, are of uniform size and of rectangular shape and advance on supply conveyor sections 2, 2 in abutted relation. The invention is not, however, limited for use on rectangular shaped articles nor is it necessary in every instance that the articles be in direct contact on the supply conveyors.

The feeding conveyors 2, 2 may have any convenient construction capable of delivering articles singly or in limited size groups onto the receiving conveyor section. As herein illustrated, the conveyors 2, 2 comprise endless belts 8, 8a passing over suitable rolls. At its discharge end each belt passes around a roll, indicated at 9 and 9a, free to rotate on a shaft 10.

The belts 8 and 8a pass around idler rolls 11, 11a, free to rotate on shaft 12, and thence around drive rolls 13, 13a fixed on aligned, but separately journalled, shafts 14, 14a. The shafts 14, 14a are driven by sprocket chains 15, 15a passing over sprockets 16, 16a mounted on hubs 17, 17a which are selectively connected to the shafts 14, 14a by means of electrically actuated clutches contained within casings 18, 18a. These casings also contain electrically actuated brakes for retaining shafts 14 and 14a in fixed position upon disengagement of the driving connection through the clutches. Any conventional clutch and brake mechanism may be employed for selectively driving the shafts 14 and 14a, and such mechanism may be controlled electrically or by completely mechanical devices. The control of the clutch and brake mechanisms and drive for sprocket chains 15 will be described in due course.

The receiving conveyors 3, 3, like conveyors 2, 2, may be of any convenient construction and are herein illustrated as endless belts 20, 20 passing around rear rolls 21, 21 and forward rolls 22, 22 mounted on respective shafts 23 and 24. The belts 20, 20 pass over driven rolls 25, 25 fixed on a shaft 26, having a sprocket 27 keyed thereon around which drive chain 28 passes. The shaft 26 has sprockets 29, 29a fixed therein around which the chains 15, 15a pass to drive sprockets 16, 16a on the clutch hubs 17, 17a.

As previously indicated, the articles leaving the conveyors 3, 3 pass over the article support section shown in the form of a flat plate 4. Instead of an elongated plate, the articles may pass along suitable guides to tilt them apart for loading into a container as shown in the application Serial No. 250,543, referred to above; or the articles, if magnetically permeable, could be transferred to an overhead magnetic conveyor, as shown in Patent No. 3,053,025. If desired, the article support section may comprise anti-friction rolls onto which the article group is transferred and brought to rest to await an oncoming push rod 6.

The rate of feed of articles from the conveyors 2, 2 is controlled so that articles may be spaced apart as they advance on conveyor 3, 3. In the present instance the conveyor belts 8, 8a are driven at approximately one-half the linear speed of belts 20, 20. By so spacing the articles on the belts 20, 20 and coordinating their movement with the push rods on conveyor 5, a push rod 6 may be brought into the space at the rear of a selected group of articles, depending upon the particular spacing of the push rods.

The conveyor 5 carrying push rods 6, 6 may be formed identically with the push rod conveyor disclosed in application Serial No. 250,543, referred to above, to comprise laterally spaced rear sprockets, one of which is indicated at 32, and laterally spaced forward sprockets, one of which is indicated at 33. Chains 34 pass over these sprockets and around idler sprockets 35 and 36 which assist the maintenance of the push rods in a desired path above the conveyor 3 and the article support section 4. Sprocket-chain guide bars may also be employed. The ends of the push rods 6, 6 are secured to the chains 34.

The forward sprockets 33 are keyed to shaft 38 which also may have a sprocket 39 keyed thereon driven by a chain 40 connected to a motor, not shown. The rear sprockets 32 are keyed on a shaft 41 on which a sprocket 42 is keyed to drive the sprocket chain 28. The sprocket ratio is preferably such that the conveyor belts 20 and push rod chains 34 will travel at the same speed. Thus, in their operation as herein disclosed, the push rods will enter the desired spaces between articles on belts 20. With the two conveyors traveling at the same speed, the push rods do not overtake and contact the articles to propel them until the article or article group comes to rest for a brief interval at the discharge ends of the belts 20.

For the purpose of facilitating the operation of the grouping mechanism, it is desirable to create spaces of increased dimension between article groups. This is accomplished by interrupting the article feed from the conveyor section 2 after delivery therefrom of a predetermined number of articles in each line. In the present mechanism provision is made to stop the belts 8, 8a periodically and hold them for a short interval and this is preferably controlled in timed relation to the travel of the push rod 6. In addition, the operation of the mechanism is made contingent on having an adequate supply of articles in each of the feeding conveyor lines.

The metering control for operating the feeding conveyor will now be described. As each article passes onto one of the receiving conveyor belts 20 it will engage a trip switch, as indicated at 45 and 45a. These may be in the form of article engaging fingers or may comprise a photocell-type switch with a light beam to be interrupted by passage of an article. It is to be understood that each belt of the feeding conveyor section is independently controlled and each trip finger is associated with a separate wiring and control circuit.

Actuation of the switch 45 operates a stepping switch 46. This switch, shown schematically in FIGURE 4, has a solenoid coil 47 with an armature 48 having a detent to engage and move a ratchet wheel 49 one step with each retraction of the armature. The switch element 46 has a finger 50 with a bevelled lower end engageable with laterally extending pins 51, 51 on the ratchet wheel 49. Engagement of a pin 51 with the end of finger 50 will cause the switch to close, and movement of the pin beyond the finger will cause the finger to move to a position to open the switch. As herein shown, the switch 46 is opened after the passage of two articles. It is obvious, however, that the step switch may be modified to open after any desired number of articles has passed the switch 45. With the step switch in its open position, means are provided for starting the feed of articles in timed relation to the push rod conveyor. For this purpose a slip ring unit, one for each conveyor, is secured on a shaft 54 which is driven from shaft 41 through bevelled gears 55 and 56. The drive ratio is such that the shaft 54 will rotate once for the passage of each push rod past a given point. The slip ring unit comprises a continuous contact portion 57 engaged by brush 58. Extending from the portion 57 is a segmental part 59 engaged by brush 60. The slip ring unit is secured adjustably on the shaft 54 and the segment 59 is so positioned that it will pass into contact with its brush 60 at the desired interval following opening of the switch.

In circuit with the slip ring units are suitable contact switches arranged to be held in closed position by the rows of articles on the supply conveyor section. These switches, indicated at 62 and 63, are arranged in each wiring unit and must be maintained in closed position for normal operation of the grouping mechanism. With switches 62 and 63 closed, and with slip ring segment 59 in contact with its brush, current will flow from the main supply line 64 through conductor 65 and switches 62 and 63 therein, through the slip ring unit, conductors 66 and 66a, through solenoid coil 67 and conductor 68 to the ground connection 69. Energization of the solenoid causes the armature rod 70 to move to close switch 71 controlling the electrically operated clutch within the casing 18. The clutch will move to its engaged position and the feeding conveyor belt 8 will be started to initiate the article feed. With the starting of the conveyor belt an article will advance onto the aligned belt 20 of conveyor section 3 and will actuate the trip switch to cause the stepping switch ratchet wheel to move one step, bringing its switch 46 to closed position. With switch 46 closed, current will flow from supply line 64 conductor 73, through the switch, conductor 74 and conductor 66a and through the coil 67 of the solenoid. The coil at this point is still energized by current flowing through the slip ring unit as above described.

The length of the segment 59 of the slip ring unit is made sufficient so that the current through the slip ring will continue to hold the clutch engaged until the first article advancing from the feeding conveyor after its period of remaining at rest reaches and actuates the switch 45.

As shown in FIGURES 1 and 2, the first article is advancing beyond the trip switch, having engaged it and caused the stepping switch to move to closed position. The next following article has advanced to the point at which it will momentarily actuate the switch and cause stoppage of the feeding conveyor belt. In FIGURE 2 the feeding conveyor is at rest and the two preceding articles are traveling in spaced-apart relation on the receiving conveyor belt.

When the stepping switch is in open position and the segment 59 is out of contact with its brush, the solenoid coil 67 will be deenergized. This will allow retraction of the armature 70 by action of the spring 77 and will close switch 78, causing current to flow through conductor 79 and through switch 78 to the electric brake operating mechanism in casing 18. Simultaneously with the application of the brake, the clutch will be disengaged. Any conventional, electrically operated clutch and brake mechanism may be employed and it is to be understood that the particular construction of the clutch and brake operating switches 71 and 78 may have various specific forms.

To summarize the operation, a supply of abutted articles is provided on each feeding conveyor as indicated in the drawings. The stepping switch 49 will be placed in its open position and the receiving and push rod conveyors will be started in operation. As soon as the segment 59 of each slip ring moves into contact with its brush the brakes controlling the feeding conveyor drives will be released and the clutches engaged. The feeding conveyor belts will then be started to deliver the leading articles onto the receiving conveyors. These leading articles actuate the switch fingers 45, 45a, causing the stepping switch ratchet wheels to advance one step to move each switch 46 to closed position. This holds the clutch switch 71 closed after the slip ring segment 59 has moved out of contact with its brush. The next following articles passing the switches 45, 45a will cause the ratchet wheels to advance one additional step, causing their switches 46 to open. This allows the switch rod 70 to move to open the clutch control switch 71 and close the brake switch 78, immediately stopping each feeding conveyor belt.

As the second article of the sequence on each row moves onto the receiving conveyor belts their trailing ends pass the point of entry of the push rod into propelling position in ample time to avoid interference with the rod. The articles, moving in spaced relation on the receiving belts, will be brought to abutted relation at the discharge end of the receiving conveyor section and, in the construction illustrated, will remain at rest briefly until the push rod reaches the trailing articles. Both rows of grouped articles will then be advanced by the push rod along the article support section 4 to a desired treating or loading station.

While the stepping switch 46 is closed the feeding conveyor continues in operation even though one or both of the switches 62, 63 are opened by reason of depletion of the supply of articles because these switches are in circuit only with the slip rings. Thereafter, until the supply of articles is replenished on the feeding conveyors to close both switches 62, 63 no articles will be delivered to the receiving conveyor and the push rod and receiving conveyors will merely operate idly.

As the supply lines on the feeding conveyor section may not be replenished uniformly the leading articles on the belts 3, 3a frequently will not be in lateral alignment and, while the belts are started at the same time, the articles may engage the switches 45, 45a at slightly different times. With the construction, as shown, this is not a disadvantage as there is a time interval following the stoppage of the feeding conveyors to provide an adequate space behind the trailing articles of each group to receive a push rod. With the article length, as indicated in the drawing, the interval of stoppage allows an article to travel on the receiving conveyor about three article lengths.

By having each belt 3 and 3a separately controlled, it is assured that the leading article in each line will be stopped before it begins to move onto the receiving conveyor to be under its control, but the stoppage need not be such that the leading articles stop in lateral alignment. Thus small deviations in lateral alignment of the articles in adjacent rows are not cumulative in effect but tend to be corrected as they occur.

While the present description sets forth a preferred embodiment of the invention, numerous changes may be made in the construction without departing from the spirit of the invention, and it is therefore desired that the present embodiment be considered in all respects as illustrative and not restrictive, reference being had to the appended claims rather than to the foregoing description to indicate the scope of the invention.

We claim:

1. A grouping mechanism for uniform size articles comprising, in combination, a storage and feeding conveyor adapted to advance a supply of aligned, abutted articles, driving means for said conveyor, means for stopping and starting said driving means, a receiving conveyor arranged to receive articles singly from the feeding conveyor, means for driving the receiving conveyor at a speed in excess of that of the feeding conveyor, whereby articles delivered to the receiving conveyor will be spaced apart, an article support means at the discharge end of the receiving conveyor along which the articles may be moved, said support means being adapted to arrest articles at the discharge end of the receiving conveyor to group them, a push rod conveyor arranged along and in spaced relation to the receiving conveyor and article support means, means for driving the push rod conveyor, and means timed with the travel of the push rod conveyor to effect the stoppage of the driving means for the feeding conveyor after the discharge of a predetermined number of articles therefrom to form a space into which a push rod may be received to propel said articles along the article support means.

2. A grouping mechanism for uniform size articles comprising, in combination, a storage and feeding conveyor for articles, means for operating the feeding conveyor, means for starting and stopping the travel of said feeding conveyor, a receiving conveyor arranged to receive articles from the feeding conveyor, means for operating the receiving conveyor, means for feeding successive articles in line from the feeding conveyor to the receiving conveyor, a metering device actuable by each article arriving on the receiving conveyor adapted to effect the stoppage of the travel of said feeding conveyor after passage of a predetermined number of articles onto the receiving conveyor to form an article group, an article support at the discharge end of the receiving conveyor arranged to support slidably a row of articles moved from such conveyor, and conveying means independent of the receiving conveyor for propelling a grouped row of articles along said support.

3. A grouping mechanism for uniform size articles comprising, in combination, a storage and feeding conveyor for articles, a receiving conveyor arranged to receive articles from the feeding conveyor, means for driving the feeding conveyor, means for starting and stopping said driving means, means for operating the receiving conveyor, means for feeding successive articles in line from the feeding conveyor to the receiving conveyor, a metering device actuable by each article arriving on the receiving conveyor adapted to stop the driving means for the feeding conveyor after passage of a predetermined number of articles onto the receiving conveyor to form an article group, an article support at the discharge end of the receiving conveyor arranged to support slidably a row of articles moved from such conveyor, conveying means independent of the receiving conveyor for propelling a grouped row of articles along said support, and means controlled by said last mentioned conveyor for restarting the driving means for the feeding conveyor after a predetermined interval.

4. A grouping mechanism for uniform size articles comprising, in combination, a storage and feeding conveyor for articles, a receiving conveyor arranged to receive articles from the feeding conveyor, means for driving the feeding conveyor, means for stopping and starting said driving means, means for operating the receiving conveyor, means for feeding articles singly and in line from the feeding conveyor to the receiving conveyor at a slower rate than the travel to the receiving conveyor, whereby articles are received in aligned, spaced relation thereon, a metering device actuable by each article arriving on the receiving conveyor adapted to effect the stoppage of the driving means for the feeding conveyor after passage of a predetermined number of articles onto the receiving conveyor, an article support at the discharge end of the receiving conveyor arranged to support slidably a row of articles moved from such conveyor, and conveying means independent of the receiving conveyor for propelling a row of articles along said support.

5. A grouping mechanism for uniform size articles comprising, in combination, a storage and feeding conveyor for articles, a receiving conveyor arranged to receive articles from the feeding conveyor, means for driving the feeding conveyor, means for stopping and starting said driving means, means for operating the receiving conveyor, means for feeding articles singly from the feeding conveyor to the receiving conveyor at a slower rate than the travel of the receiving conveyor, whereby articles are received in spaced relation thereon, a metering device actuable by each article arriving on the receiving conveyor adapted to effect the stoppage of the driving means for the feeding conveyor after passage of a predetermined number of articles onto the receiving conveyor, an article support at the discharge end of the receiving conveyor arranged to support slidably a row of articles moved from such conveyor, conveying means independent of the receiving conveyor for propelling a row of articles along said support, and means controlled by said last mentioned conveyor for restarting the driving means for the feeding conveyor after a predetermined interval.

6. A grouping mechanism for uniform size articles comprising, in combination, a storage and feeding conveyor for delivering articles singly and in line, driving means for the conveyor to advance articles thereon, said driving means including a clutch mechanism whereby operation of the conveyor may be temporarily interrupted, control means for engaging and disengaging the clutch, a receiving conveyor at the discharge end of the feeding conveyor to receive articles in line from such conveyor, driving means for the receiving conveyor, an article support at the discharge end of the receiving conveyor to receive slidably a line of articles from the receiving conveyor, an article group conveyor having a plurality of spaced propelling means for propelling individual article groups from the discharge end of the receiving conveyor along said article support, means for driving the article group conveyor, a metering device actuable by each article arriving on the receiving conveyor adapted to actuate the clutch control means to disengage the clutch after passage of a predetermined number of articles onto the receiving conveyor, and control means operating in time with the travel of the article group propelling means to actuate the clutch control means to engage the clutch and resume advance of the articles on the feeding conveyor after a predetermined time interval.

7. A grouping mechanism for uniform size articles comprising, in combination, a storage and feeding conveyor for delivering articles singly and in line, driving means for the conveyor to advance articles thereon, said driving means including a clutch mechanism whereby operation of the conveyor may be temporarily interrupted, control means for engaging and disengaging the clutch, a receiving conveyor at the discharge end of the feeding conveyor to receive articles in line from such conveyor, driving means for the receiving conveyor operable at a speed in excess of that of the feeding conveyor whereby articles delivered onto the receiving conveyor will be spaced, an article support at the discharge end of the receiving conveyor to receive slidably a line of articles from the receiving conveyor, an article group conveyor having a plurality of spaced propelling means for propelling individual article groups from the discharge end of the receiving conveyor along said article support, means for driving the article group conveyor to advance articles at a speed comparable with that of the receiving conveyor, a metering device actuable by each article arriving on the receiving conveyor adapted to actuate the clutch control means to disengage the clutch after passage of a predetermined number of articles onto the receiving conveyor, and control means operating in time with the travel of the article group propelling means to actuate the clutch control means to engage the clutch and resume advance of the articles on the feeding conveyor after a predetermined time interval.

8. A grouping mechanism for uniform size articles comprising, in combination, a storage and feeding conveyor for delivering articles singly and in line, driving means for the conveyor to advance articles thereon, said driving means including a clutch mechanism whereby operation of the conveyor may be temporarily interrupted, control means for engaging and disengaging the clutch, a receiving conveyor at the discharge end of the feeding conveyor to receive articles in line from such conveyor, driving means for the receiving conveyor operable at a speed in excess of that of the feeding conveyor whereby articles delivered onto the receiving conveyor will be spaced, an article support at the discharge end of the receiving conveyor to receive slidably a line of articles from the receiving conveyor, an article group conveyor having a plurality of spaced push rods for propelling individual article groups from the discharge end of the receiving conveyor along said article support, means for driving the article group conveyor to advance articles at a speed comparable with that of the receiving conveyor, a metering device actuable by each article arriving on the receiving conveyor adapted to actuate the clutch control means to disengage the clutch after passage of a group of a predetermined number of articles onto the receiving conveyor and thereby create a space following such group for the entry of a push rod, and control means operating in time with the travel of the push rods to actuate the clutch control means to engage the clutch and resume advance of the articles on the feeding conveyor after a predetermined time interval.

References Cited by the Examiner
UNITED STATES PATENTS 2,878,919   3/59   Jones _____ 198—34

SAMUEL F. COLEMAN, *Primary Examiner.*

ERNEST A. FALLER, Jr., *Examiner.*